United States Patent [19]

Shigaki

[11] Patent Number: 5,191,371
[45] Date of Patent: Mar. 2, 1993

[54] PHOTOFINISHING AND PRESERVING METHOD FOR PHOTOGRAPHIC FILM AND FILM CASSETTE THEREFOR

[75] Inventor: Takao Shigaki, Kanagawa, Japan

[73] Assignee: Fuji Photo Film Co., Ltd., Kanagawa, Japan

[21] Appl. No.: 777,140

[22] Filed: Oct. 16, 1991

Related U.S. Application Data

[62] Division of Ser. No. 622,032, Dec. 4, 1990, Pat. No. 5,093,686.

[30] Foreign Application Priority Data

Dec. 5, 1989 [JP] Japan .................. 1-315893

[51] Int. Cl.⁵ .............................................. G03B 17/26
[52] U.S. Cl. .................................................. 354/275
[58] Field of Search ............... 354/275; 242/71.1, 71.2, 242/71.6, 71, 74, 74.1, 74.2

[56] References Cited

U.S. PATENT DOCUMENTS

| | | | |
|---|---|---|---|
| 3,645,467 | 2/1972 | Sato et al. | 242/74.2 |
| 4,396,164 | 8/1983 | Maeda et al. | 242/74.1 |
| 4,482,232 | 11/1984 | Engelsmann et al. | 354/275 |
| 4,875,637 | 10/1989 | Beach | 354/275 X |
| 5,083,721 | 1/1992 | Okutsu et al. | 242/71.1 |

Primary Examiner—Donald A. Griffin
Assistant Examiner—D. Rutledge
Attorney, Agent, or Firm—Sughrue, Mion, Zinn, Macpeak & Seas

[57] ABSTRACT

A processed film is wound again into the film cassette that contained the film therein before processing. The film is subjected to development and/or printing with one end fixed to a spool of the film cassette. Using a film cassette constituted by a rotatable spool having on its peripheral surface capture members for engaging in perforations of the film, a film guide member for guiding the film from a film gate of the cassette to the spool, and an urging device for pressing the film guide member onto the spool and enabling the guided film to be engaged with the capture members, it is possible to separate the film from the film cassette for development and printing and thereafter to wind up the film into the film cassette.

3 Claims, 7 Drawing Sheets

PHOTOFINISHING AND PRESERVING METHOD FOR PHOTOGRAPHIC FILM AND FILM CASSETTE THEREFOR

This is a divisional of application Ser. No. 07/622,032, filed Dec. 4, 1990, now U.S. Pat. No. 5,093,686.

BACKGROUND OF THE INVENTION

The present invention relates to a photofinishing and preserving method for photographic film, and to a film cassette for implementing the method.

Conventionally, a photofinisher unwinds and separates an exposed 35 mm negative film from the film cassette for developing and printing, and throws away the empty film cassette. The developed film is cut into pieces of six picture frames each, for instance, and the film pieces are inserted in a film cover sheet to preserve them in a proper condition. The film pieces in the film cover sheet are returned to the customer along with the prints.

In the foregoing process, a great number of empty film cassettes have been thrown away as industrial waste products, an undesirable state of affairs, in view of the need to use resources efficiently.

Further, as a practical matter, most of the developed films returned to ordinary customers will never be used again except when extra prints are made, so that the films often are scattered and lost. One of the reasons for this loss is that the film pieces are not folded up any further, and thus require a relatively large space for storage, making it difficult to put them in order.

On the other hand, it is necessary for the photofinisher to cut a film into pieces and also to insert the film pieces in the film cover sheet, reducing the efficiency of photofinishing as a result.

SUMMARY OF THE INVENTION

In view of the foregoing, one object of the invention is to provide a method of photofinishing and preserving a photographic film which takes advantage of the film cassette that has been thrown away, and which facilitates film handling.

Another object of the invention is to provide a film cassette by which the inventive method can be realized.

To achieve these and other objects, in accordance with the present invention, a processed film is wound up again into the film cassette that contained the film before it was processed.

A photofinishing and preserving method for photographic film may include the steps of subjecting an exposed film, which is fully withdrawn from a film cassette but is fixed at one end to a spool of the film cassette, to development and printing without separating from the film cassette, and taking up the film into the film cassette after the printing.

The above objects of the present invention also are accomplished by a method including the steps of withdrawing and separating a film from a film cassette, and taking up the separated film into the film cassette after developing and printing the film.

It is possible to take up the developed film into the film cassette without subjecting it to printing.

A film cassette used in the inventive method preferably is constituted by a spool for winding a film thereon, capture members disposed on the peripheral surface of the spool to be engaged in perforations of the film, a housing for holding the spool rotatably in light-tight fashion, a light-tight film gate formed in the housing, a film guide for guiding the film from the film gate to the capture members on the spool, and urging means for pressing the film guide at one end against the capture members on the peripheral surface of the spool.

Because a film withdrawn from a film cassette is wound up again into the film cassette after the development and/or printing, the developed film can be preserved in a compact form, protected from dust and blemishes. Further, reusing the film cassette reduces the amount of industrial waste.

BRIEF DESCRIPTION OF THE DRAWINGS

These and other objects and advantages of the invention will become apparent from the following detailed description when read in conjunction with the accompanying drawings, wherein.

DETAILED DESCRIPTION OF THE PREFERRED EMBODIMENTS

Figure 1:
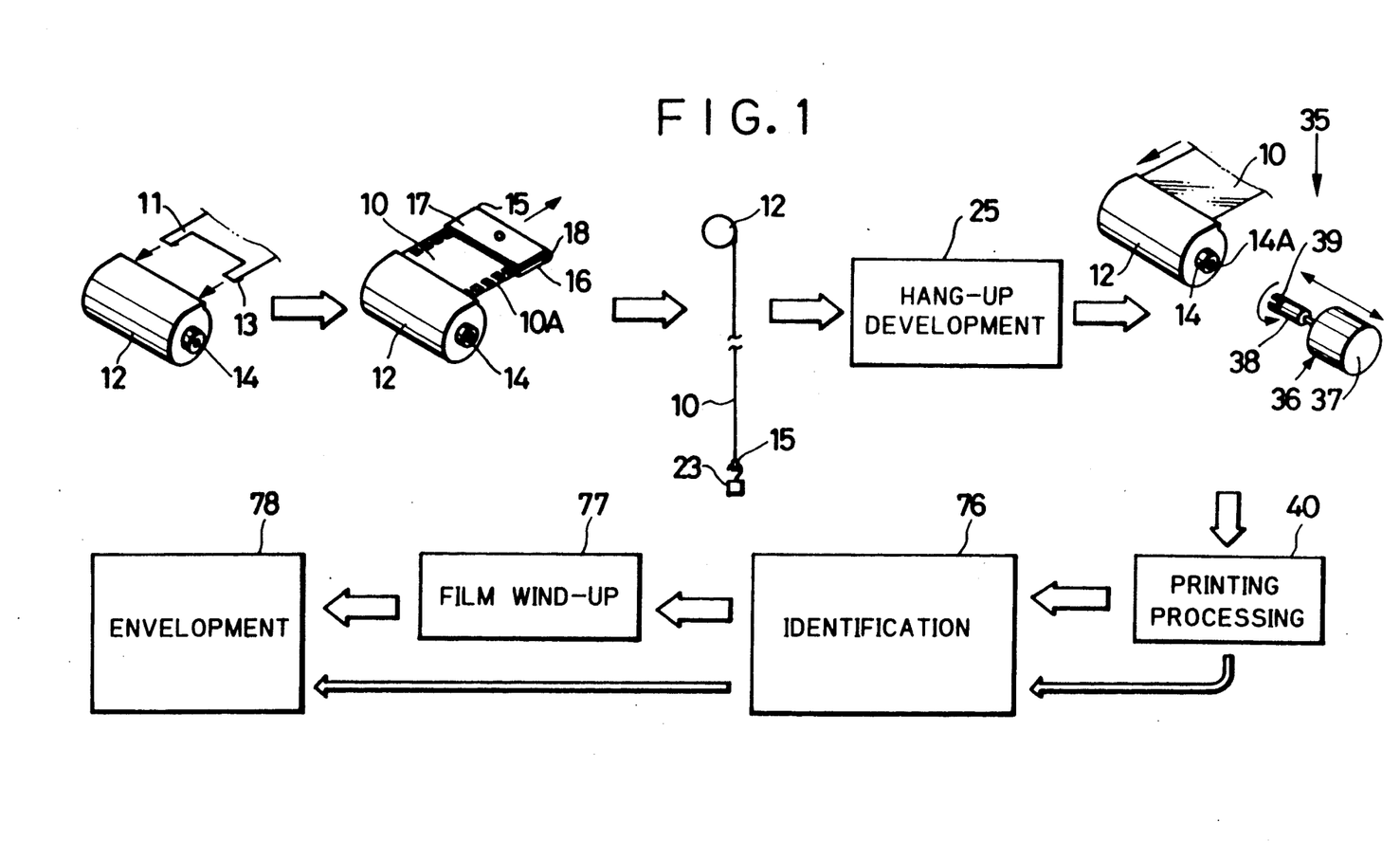
FIG. 1 is an explanatory view illustrating a photofinishing method according to a first embodiment of the invention.

In FIG. 1 illustrating respective steps of a photofinishing method according to a preferred embodiment of the present invention, wider arrows indicate the flow of processing a negative photographic film 10, whereas more slender arrows indicate the flow of processing photographic prints obtained from the film 10.

The leader portion of the exposed film 10 is pulled out automatically from a film cassette 12 by means of a film splicer (now shown). At its free end, the film leader pull-out device 11 has a pair of engaging members 13 to be engaged in perforations 10A of the film 10. After being pulled out, the leader portion of the film 10 is attached with a stopper 15 such that the stopper 15 nips the leader portion and prevents the film from being wound completely into the cassette 12.

Figure 2:
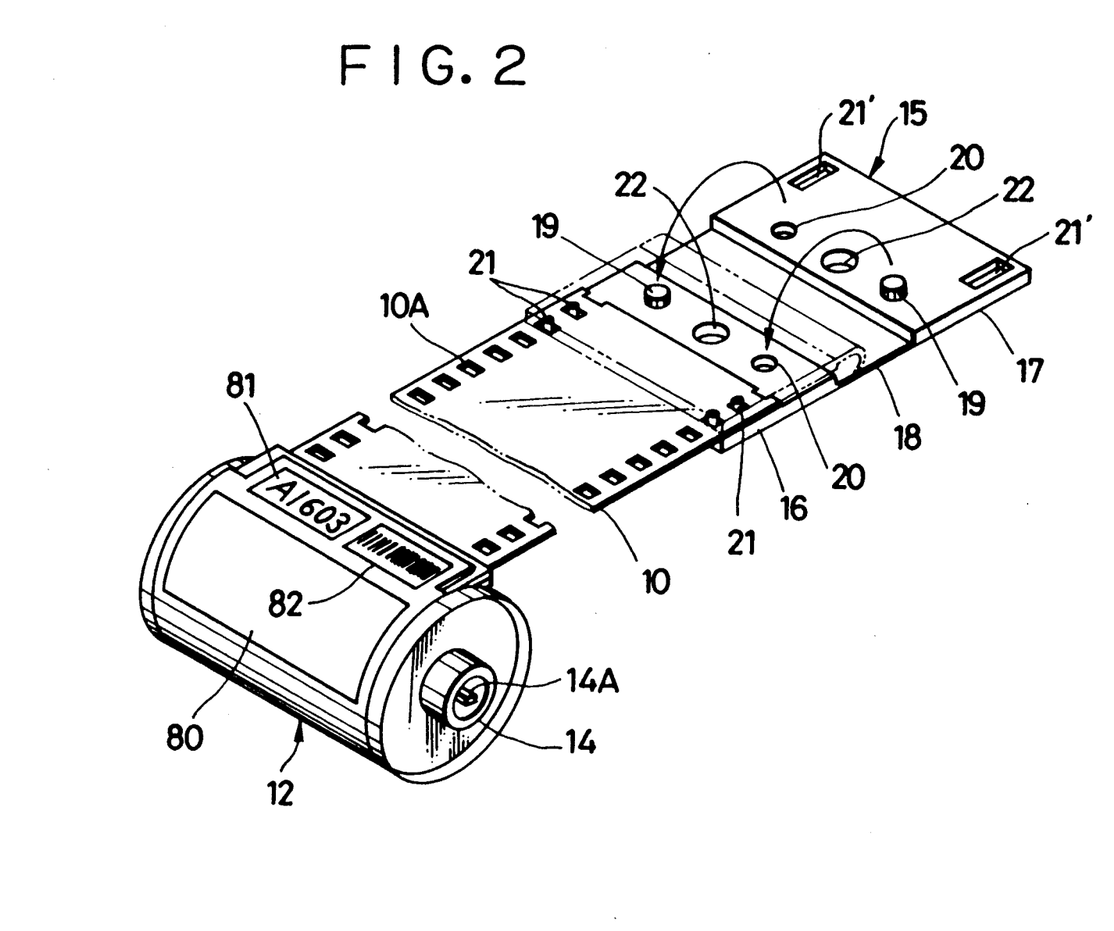
FIG. 2 is a perspective view illustrating a negative film withdrawn from a film cassette.

As shown in FIG. 2, the stopper 15 is constituted by a pair of nipping members 16 and 17 connected to each other by a hinge member 18. The nipping members 16 and 17 are formed with a pin 19 and a hole 20, the pin 19 of one nipping member being fitted in the hole 20 of another nipping member so as to nip the leader portion of the film 10 therebetween. On the surfaces of the nipping members 16 and 17 which are brought into contact with each other in the nipping condition, there are formed pins 21 and corresponding slots 21', respectively. The pins 21 are engaged in the perforations of the film to prevent the stopper 15 from slipping out from the film 10. The stopper 15 also is formed at its center portion with an opening 22 in which a weight 23 is hung to stretch the film 10 vertically.

Figure 3:
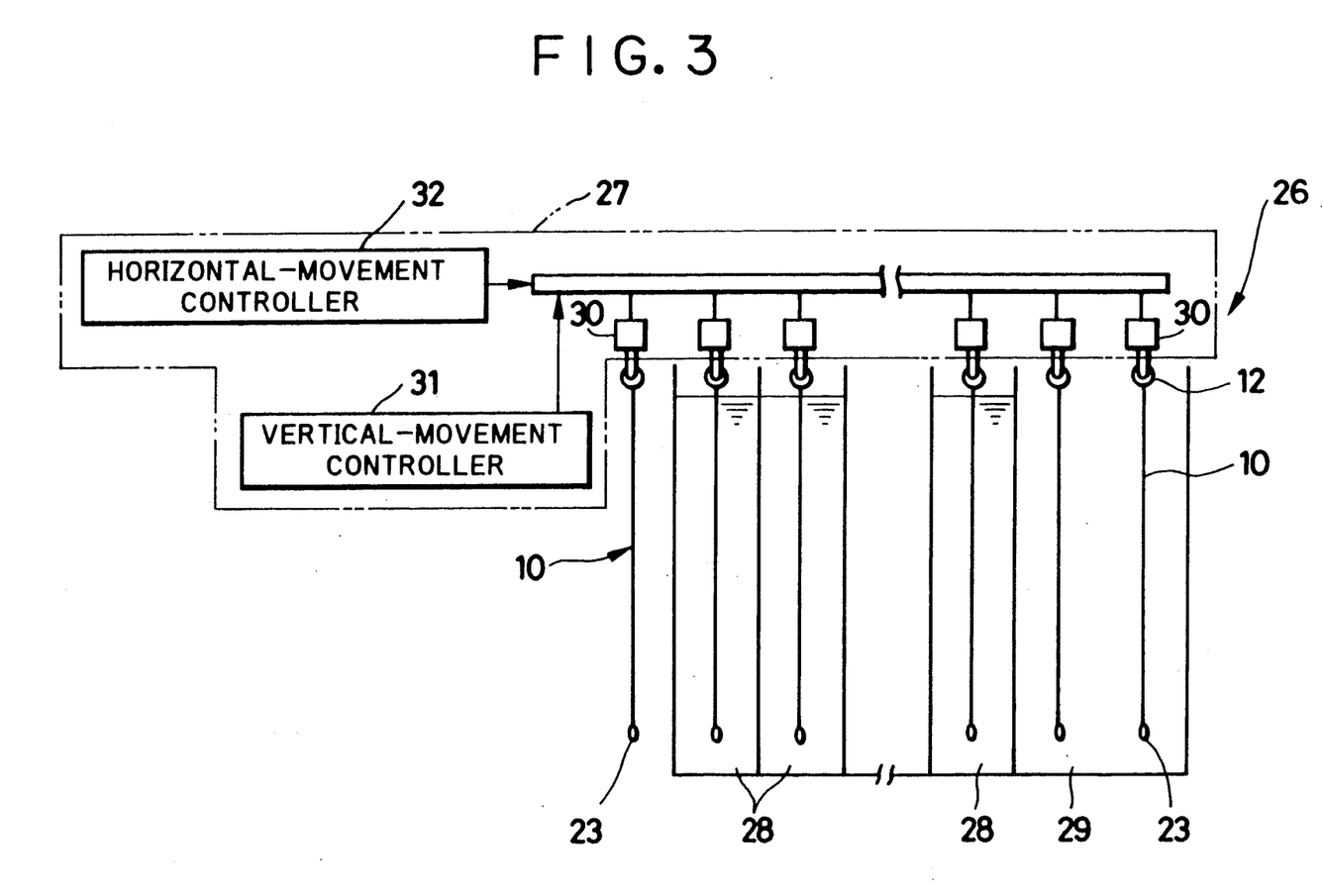
FIG. 3 is a schematic view illustrating a dunking machine for hang-up development.

During hang-up development 25, the film 10 is subjected to the development while being suspended from the cassette 12. A dunking machine 26 for hang-up development is shown in FIG. 3, wherein a film transporting device 27 transports the films 10 for dipping sequentially in the respective processing baths. Processing tanks 28, including color developing tanks, bleaching tanks, bleaching-fix tanks, super-rinsing tanks and stabilizing tanks, are arranged sequentially, as is well-known in the art. After being stabilized, the films 10 are dried in a drier 29 using blown hot air.

The film transporting device 27 is constituted by fixing members 30, each clamping a spool 14 of a film cassette 12 at both ends thereof, and vertical and horizontal transport control sections 31 and 32 for transporting the respective films 10 hung on the fixing members 30 for feeding to the processing tanks 28 and the drier 29 in a sequential manner. The vertical transport control section 31 lifts the films 10 up to a horizontal transport position where the films can move horizontally, while the horizontal transport control section 32 controls movement of the lifted films 10 to the next step. The horizontal movement may be bidirectional or circular. The fixing members are held by a chain, turntable or the like.

After being developed through hang-up development 25, the film 10 is wound up into the cassette 12 by means of a wind-up device 36 in a wind-up process 35. The wind-up device 36 is constituted by a motor 37 and an engaging fork 39 mounted on the motor shaft through a friction clutch 38. The engaging fork 39 is brought into engagement with an engaging member 14A formed in the end portion of the spool 14, so as to rotate the spool 14. When the film 10 is completely wound onto the spool 14, the stopper 15 contacts the film gate of the cassette 12, so that the spool 14 cannot rotate any more, so that the friction clutch 38 idles.

Figure 4:
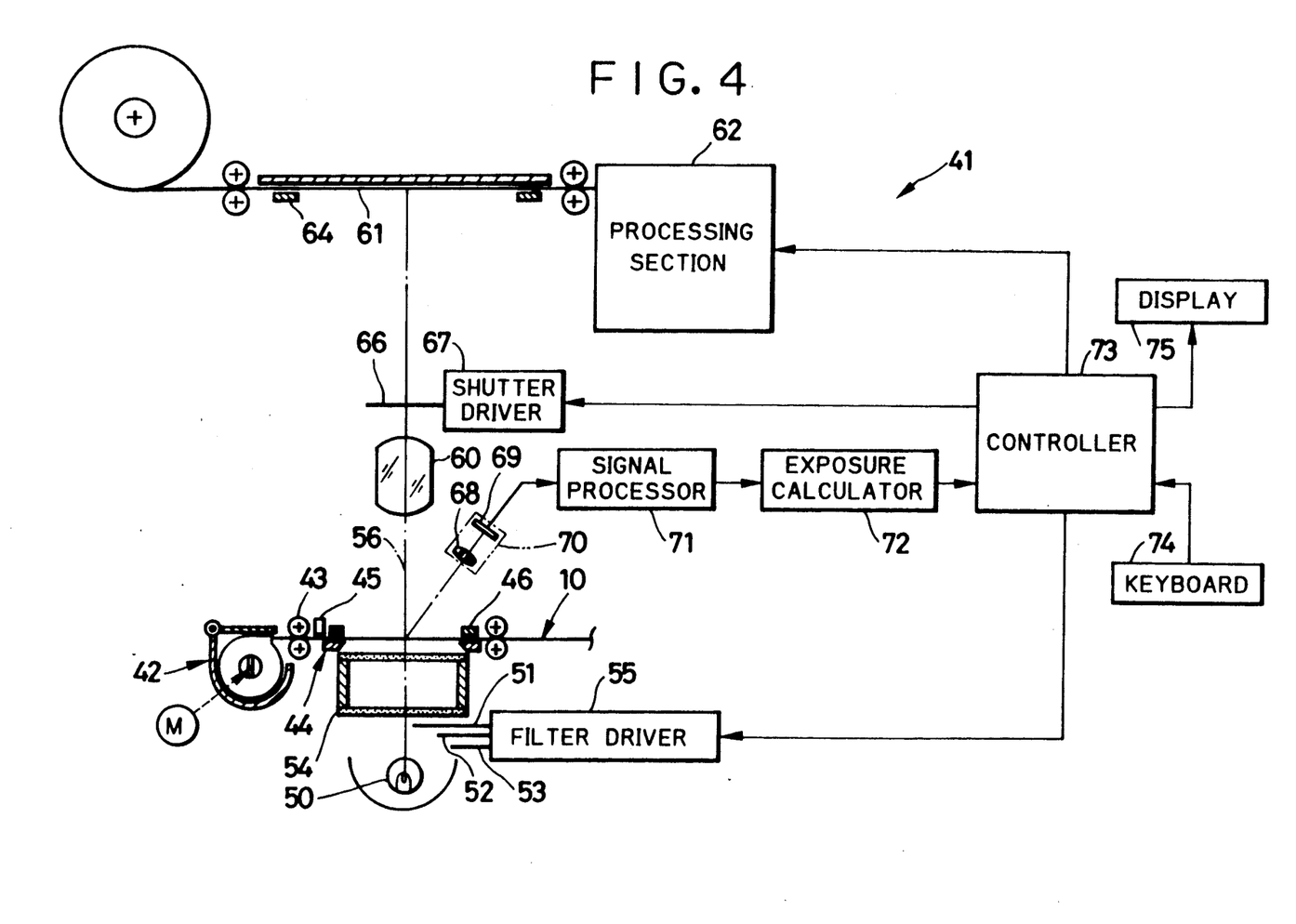
FIG. 4 is a schematic view illustrating a printer-processor.

Next, the developed film 10 is subjected to printing-processing 40. The stopper 15 is removed from the developed film 10 contained in the cassette 12, and thereafter the cassette 12 is set in a cassette receiver 42 of a printer-processor 41 as shown in FIG. 4, with the leader portion of the film 10 held between a pair of feed rollers 43. The feed roller pair 43 feeds the film to a printing station at a film supporting member 44. A margin sensor 45 is disposed before the printing station to detect a margin of each picture frame, for example each leading margin, and to generate a detection signal when each picture frame is positioned in the printing station. In order to keep the film surface on the supporting member 44 flat, a film framing mask 46 with an opening having a size corresponding to a picture frame is provided, which is removed from the film 10 by the force of a solenoid (not shown) during transporting the film and presses the film 10 during printing.

White light projected from a light source 50 travels through any of a cyan, magenta and yellow filters 51, 52 and 53 to enter a mixing box 54. The insertion amounts of these color-compensating filters 51 to 53 into an exposure light path 56 are controlled by a filter driver 53 in accordance with a command from a controller 73, thereby to correct the three primary color components and the intensity thereof. The mixing box 54 is constituted by a rectangular barrel having mirrored inner surfaces and diffusion plates on both ends. Light passing through the mixing box 54 illuminates the picture frame positioned on the supporting member 44.

On the opposite side of the printing station from the light source 50, a printing lens 60 is disposed to form an optical image of the frame image onto a color photographic paper 61, the image size being defined by a paper framing mask 64. Between the printing lens 60 and the color paper 61, a shutter 66 is disposed which is driven by a shutter driver 67 to move out of the exposure light path 56 for a predetermined time for printing.

In FIG. 4, a scanner 70 is disposed above and to the right side of the printing station so as to measure light passing through respective picture elements of the frame image set in the printing station. Signals from the scanner 70 are sent to a signal processor 71 which converts the signals logarithmically and then into a digital form. The digital signals, representing the density of each picture element, are sent to an exposure calculator 72 where an exposure value is calculated through a well-known exposure-calculating operation on the basis of the density signals and correction data which are detected, for example, by a pre-judgment of the frame images performed as needed. The calculated exposure value is sent to the controller 73.

The controller 73, constituted by a well-known microcomputer, is connected to a keyboard 74 for setting up various control modes and inputting inspection data for pre-judgment, as well as to a display 75 for displaying these input data and the execution mode. The controller 73 determines a set of filter positions for the color compensating filters 51 to 53 in consideration of the relation between the exposure value and the insertion amounts of the filters 51 to 53. In response to signals from the controller 73 representative of the determined filter positions, the filter driver 55 controls the filters 51 to 53 to adjust the three primary color components. The controller 73 also controls the shutter 66 through the shutter driver 67 in accordance with the determined exposure value. In this way, each frame image on the film 10 is printed sequentially onto the color paper 61. The printed color paper 61 is fed to a processing section 62 for development, and thereafter is cut into individual prints.

Referring again to FIG. 1, after printing, an identification process 76 is performed to identify the frame images to be printed with the finished prints. Then, the film 10 is wound up into the cassette 12 by means of the above described wind-up device 36 in a film wind-up process 77. In the end process 78, the film 10 received in the cassette 12 is enclosed with the prints in an envelope and is forwarded to the customer.

As shown in FIG. 2, it is preferable for the arrangement of the developed films to stick a white seal 80 onto the outer surface of the cassette 12 so that the customer may write information on the images recorded on the film contained therein. By sticking an ID (identification) number seal 81 and/or a bar code seal 82 having a code corresponding to the ID number onto the outer surface of the cassette 12, designating the date of and prescription for the photofinishing of the contained film, it becomes easier to identify the prints with the frame images if the prints are recorded on the rear surface with the corresponding picture frame number.

Although in the above embodiment the film 10 is kept fixed at one end to the spool 14 even while being withdrawn from the cassette 12 for development and printing, it is possible to remove a film from its cassette, and to splice a large number of films, forming a roll of long negative film for development in a well-known continuous film processor, a so-called cine-type automatic processing machine, wherein a roll of spliced films is developed continuously. The processed long film may be printed in a conventional automatic printer-processor, wherein frame images of the long film are printed continuously on a roll of photographic paper. After printing, the long film is cut at every spliced portion, and the individual films are wound up into the original cassettes, respectively.

Figure 5:
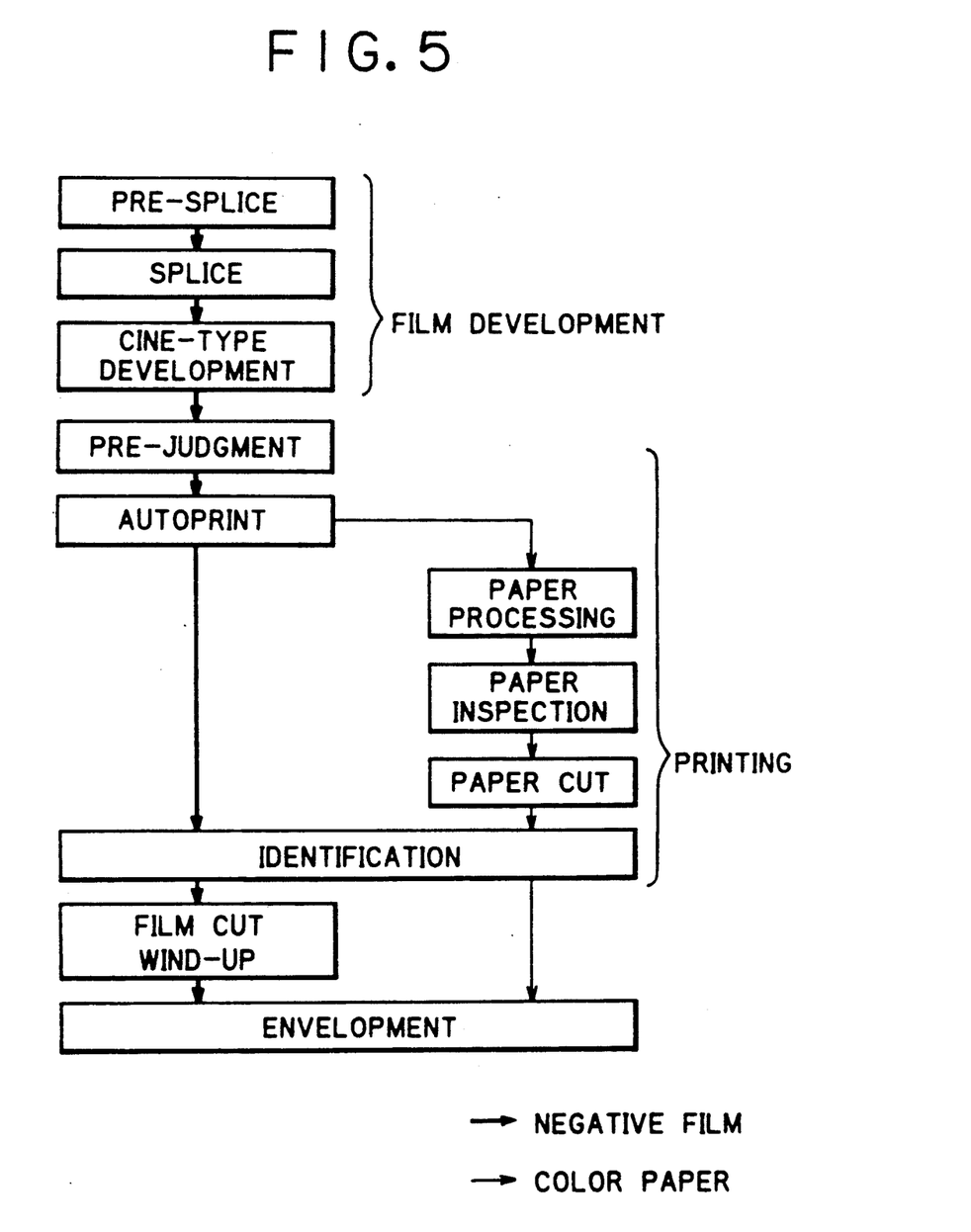
FIG. 5 is a flow chart for explaining a photofinishing method according to a second embodiment of the invention.

FIG. 5 illustrates the photofinishing procedure according to this second embodiment of the invention, wherein bold arrows indicate the flow of the negative film, whereas more slender arrows indicate the produced prints, as in FIG. 1. In the pre-splice process, each film is withdrawn and separated from the cassette to be spliced.

Figure 6:
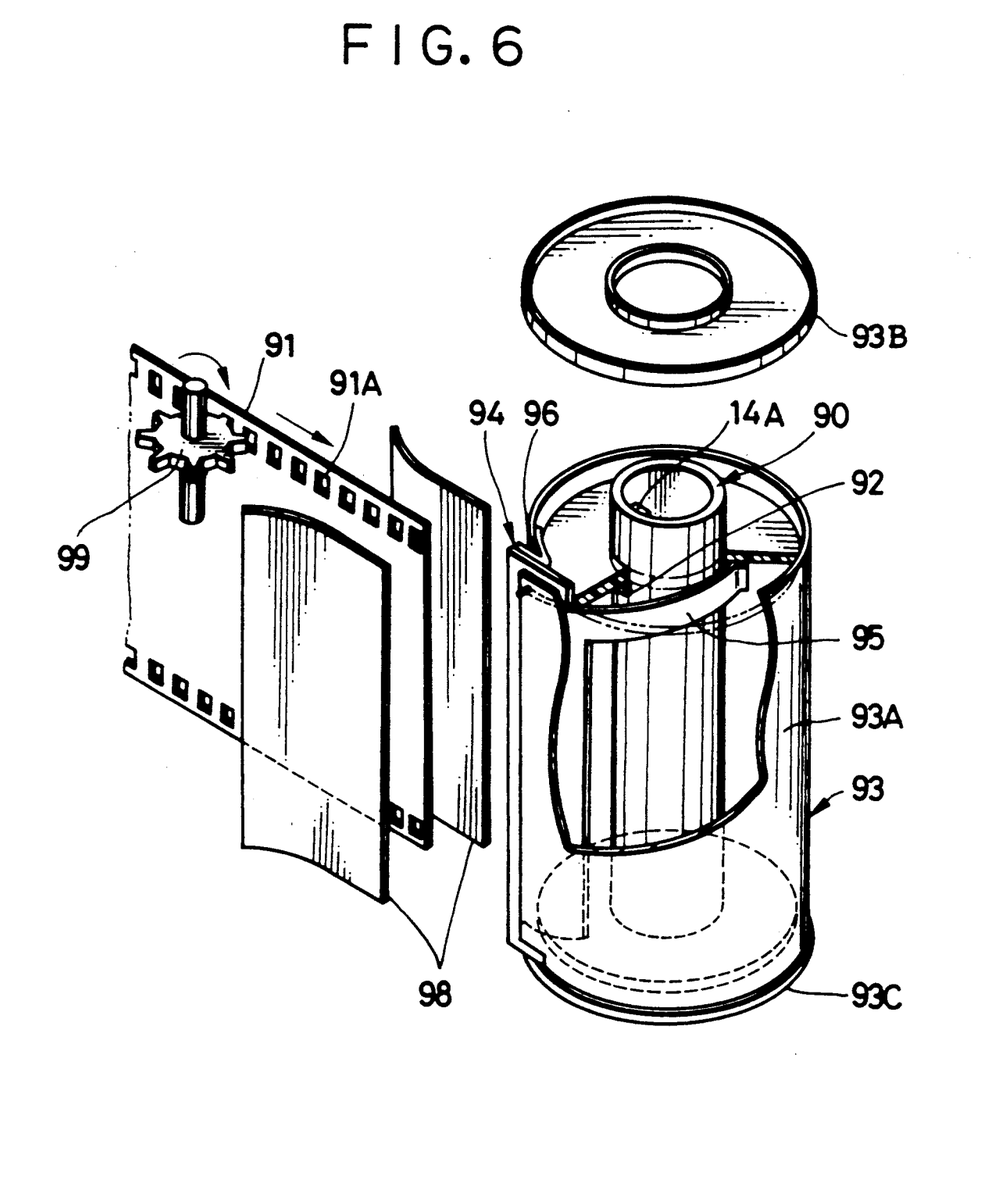
FIG. 6 is an exploded view of a film cassette.
Figure 7:
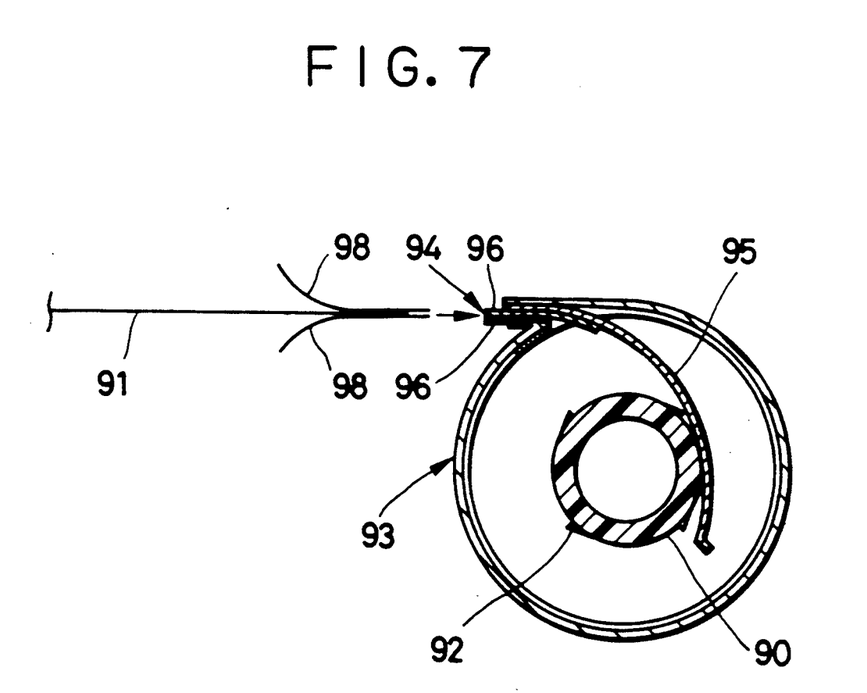
FIG. 7 is a transverse section of the film cassette of FIG. 6.

Referring now to FIGS. 6 and 7, a construction of a cassette, into which a separate film can be wound up, will be described. The cassette 93 differs from conventional ones in that a spool 90 is formed at its periphery with capture members 92 to be engaged in perforations 91A of a negative film 91, and that an elastic guide plate 95 is provided for guiding an end portion of the film 91 from a film gate 94 to the capture members 92.

The guide plate 95, which may be made of plastic and/or metal, presses the film end portion against the spool 90 by the elastic force. In this way, the perforations 91A are surely engaged with the capture members 92, and thus the film 91 is wound on the spool 90 by rotating the spool 90. The guide plate 95 is formed more narrowly in the end portion close to the spool so that it presses the film 91 only at the edge portion having perforations, so as not to harm the film surface having frame images.

Instead of the elastic guide plate 95, a guide plate urged by a coil spring, spring plate or the like may be applicable. The film gate 94 is attached with a well-known light-shielding plush 96.

When winding up the developed film 91 into the cassette 93, the end portion of the film 91 is held between a pair of guide members 98 and is inserted along with the guide members 98 into the film gate 94. Thereafter the guide members 98 are loosened to allow the film 91 to be advanced further into the cassette, while the film is advanced by means of a rotary force of a sprocket wheel 99 having teeth engaging the perforations 91A. When the film end reaches the peripheral surface of the spool 90, the perforation 91A is engaged with the ratchet 92, so that the film is wound up thereafter into the cassette 93 while the spool 90 is rotated by the above wind-up device 36. Because the film 91 to be received in the cassette 93 at this stage has been developed already, even if the plush 96 is broken and thus loses its light-tightness because of the insertion of the guide members 98, it does not matter to the film 91.

When accommodating an unexposed film in this type of cassette 93, the unexposed film may be wound on the spool 90 and then inserted in a cassette housing 93A, which thereafter is fitted with cover members 93B and 93C to be closed light-tightly, as for a conventional 35 mm photographic film. However, it may be possible to insert the unexposed film into the cassette 93 in the same way as for the developed film 91.

In order to use the film 91 contained in the cassette 93 in practice, since the film 91 is engaged only at its end portion in the capture members 92 of the spool 90 and therefore would slip out from the cassette 93 if the film 91 continues to be advanced after all available frames are exposed. After slipping out of the cassette 93, the film 91 would not be inserted in the cassette 93 inside a camera. To prevent the removal of the film from the cassette 93, it may be possible to provide an end mark such as a notch near the end of a film for indicating the film end, and to detect the end mark by a sensor such as an optical sensor disposed in the camera, so as to stop advancing the film 91 from the cassette 93 in response to a sensor signal. It also may be possible to read a DX code or the like recorded on the periphery of the cassette so as to memorize the available frame number of the loaded film in a camera and automatically to rewind the film into the cassette after all the frames have been exposed.

Although the invention has been described in detail above with reference to such embodiments where the film is subjected to printing immediately after development and the developed film is returned to the customer along with the finished prints, it will be understood that the invention would not be limited by these embodiments; rather, various modifications can be effected within the spirit and scope of the invention. For example, the developed film may be wound up into the cassette and returned to the customer without being subjected to printing.

What is claimed is:

1. A cassette for a roll of photographic film, comprising:
    a spool having capture members on a peripheral surface thereof, said capture members engaging in perforations formed in said film;
    a light-tight housing holding spool therein and having a light-tight film gate through which said film is withdrawn from and inserted into said cassette;
    means for guiding said film from said film gate to said spool; and
    urging means for pressing a tip of said guiding means onto said capture members on said peripheral surface of said spool.

2. A cassette as defined in claim 1, wherein said spool includes means for enabling rotation of said spool by means of a driving means positioned externally of said housing.

3. A cassette as defined in claim 2, further comprising a recording medium, disposed on said cassette, on which information is recorded about frame images of a developed film contained within said cassette.

* * * * *